United States Patent
Xiao et al.

(10) Patent No.: US 8,984,287 B2
(45) Date of Patent: Mar. 17, 2015

(54) WIRELESS PERSONAL AREA NETWORK ACCESS METHOD BASED ON PRIMITIVE

(75) Inventors: Yuelei Xiao, Shaanxi (CN); Jun Cao, Shaanxi (CN); Xiaolong Lai, Shaanxi (CN); Zhenhai Huang, Shaanxi (CN); Bianling Zhang, Shaanxi (CN); Zhiqiang Qin, Shaanxi (CN); Qizhu Song, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 391 days.

(21) Appl. No.: 12/863,285

(22) PCT Filed: Jan. 14, 2009

(86) PCT No.: PCT/CN2009/070137
§ 371 (c)(1),
(2), (4) Date: Jul. 16, 2010

(87) PCT Pub. No.: WO2009/092314
PCT Pub. Date: Jul. 30, 2009

(65) Prior Publication Data
US 2011/0029776 A1     Feb. 3, 2011

(30) Foreign Application Priority Data
Jan. 18, 2008   (CN) .......................... 2008 1 0017344

(51) Int. Cl.
*H04L 9/32*       (2006.01)
*H04L 29/06*      (2006.01)
(Continued)

(52) U.S. Cl.
CPC ............... *H04W 12/04* (2013.01); *H04L 63/08* (2013.01); *H04L 29/08576* (2013.01); *H04L 63/0428* (2013.01); *H04W 12/06* (2013.01)

USPC .......... 713/171; 713/168; 380/255; 380/270; 709/227

(58) Field of Classification Search
USPC ............ 709/227; 380/255, 270; 713/168, 171
See application file for complete search history.

(56) References Cited

U.S. PATENT DOCUMENTS 7,239,864 B2   7/2007   Zhang
7,275,157 B2 *  9/2007  Cam Winget ................ 713/168
(Continued)

FOREIGN PATENT DOCUMENTS

CN       1455556 A     11/2003
CN       1553730 A     12/2004
(Continued)

OTHER PUBLICATIONS

Khan, M; Amini, F; Misic, J; Misic, V."The Cost of Security: Performance of ZigBee Key Exchange Mechanism in an 802. 15.4 Beacon Enabled Cluster", Mobile Adhoc and Sensor Systems (MASS), 2006 IEEE International Conference on, 2006, pp. 876-881 [retrieved from IEEE database on Jun. 9, 2012].*

(Continued)

*Primary Examiner* — Aravind Moorthy
*Assistant Examiner* — Jason Plotkin
(74) *Attorney, Agent, or Firm* — Harness, Dickey & Pierce, P.L.C.

(57) ABSTRACT

A wireless personal area network access method based on the primitive, includes: a coordinator broadcasts a beacon frame to the device which requests connecting to the wireless personal area network (WPAN), the beacon frame includes the authentication request information for the device and the authentication and a key management tool supported by the coordinator; the device authenticates the authentication request information, when the coordinator has an authentication request to the device, the coordinator and the device execute the authentication based on the primitive and obtains the conversation key.

8 Claims, 2 Drawing Sheets

(51) Int. Cl.
  *H04W 12/04* (2009.01)
  *H04L 29/08* (2006.01)
  *H04W 12/06* (2009.01)

(56) References Cited

U.S. PATENT DOCUMENTS

| | | | |
|---|---|---|---|
| 7,539,169 B1 * | 5/2009 | O'Hara et al. | 370/338 |
| 7,676,676 B2 * | 3/2010 | Braskich et al. | 713/169 |
| 7,684,380 B2 * | 3/2010 | Odman | 370/348 |
| 2004/0240412 A1 | 12/2004 | Winget | |
| 2005/0091389 A1 * | 4/2005 | Qi et al. | 709/229 |
| 2005/0265371 A1 | 12/2005 | Sharma et al. | |
| 2006/0039340 A1 | 2/2006 | Ptasinski et al. | |
| 2006/0041749 A1 | 2/2006 | Ptasinki et al. | |
| 2006/0041750 A1 | 2/2006 | Carter et al. | |
| 2006/0136715 A1 | 6/2006 | Han et al. | |
| 2006/0161771 A1 | 7/2006 | Zhang | |
| 2006/0270438 A1 | 11/2006 | Choi | |
| 2007/0104138 A1 | 5/2007 | Rudolf et al. | |
| 2007/0190973 A1 | 8/2007 | Goto et al. | |
| 2007/0226499 A1 | 9/2007 | Zhang | |
| 2007/0280169 A1 | 12/2007 | Cam Winget | |
| 2008/0086760 A1 * | 4/2008 | Jiang et al. | 726/3 |
| 2008/0118069 A1 | 5/2008 | Yang | |
| 2008/0130530 A1 * | 6/2008 | Gabay | 370/310 |

FOREIGN PATENT DOCUMENTS

| | | | |
|---|---|---|---|
| CN | 1588842 A | | 3/2005 |
| CN | 1685694 A | | 10/2005 |
| CN | 1705245 A | | 12/2005 |
| CN | 1780244 A | | 5/2006 |
| CN | 1836404 A | | 9/2006 |
| CN | 101010913 A | | 8/2007 |
| CN | 101080883 A | | 11/2007 |
| CN | 101227362 A | | 7/2008 |
| CN | 101232419 A | | 7/2008 |
| EP | 1523129 A2 | | 4/2005 |
| JP | 2003258790 A | | 9/2003 |
| JP | 2006025420 A | | 1/2006 |
| JP | 2006121545 A | | 5/2006 |
| JP | 2006332788 A | | 12/2006 |
| JP | 2007208816 A | | 8/2007 |
| JP | 2008506284 A | | 2/2008 |
| KR | 20070071583 A | | 7/2007 |
| WO | WO-2004107780 A2 | | 12/2004 |
| WO | WO-2004114612 A2 | | 12/2004 |
| WO | WO-2006003202 A1 | | 1/2006 |
| WO | WO 2007071277 A1 * | | 6/2007 |
| WO | WO-2007106042 A1 | | 9/2007 |
| WO | WO-2008088052 A1 | | 7/2008 |

OTHER PUBLICATIONS

Heo, J.; Hong, CS."Efficient and Authenticated Key Agreement Mechanism in Low-Rate WPAN Environment", Wireless Pervasive Computing, 2006 1st International Symposium on, 2006 , pp. 1-5 [retrieved from IEEE database on Jun. 9, 2012].*

IEEE Standard for Information Technology—Telecommunications and information exchange between systems—Local and metropolitan area networks—Specific requirements, Part 11: Wireless LAN Medium Access Control (MAC) and Physical Layer (PHY) Specifications, Jun. 12, 2007. (retrieved from IEEE on Aug. 15, 2013).*

IEEE Standard for Information technology—Telecommunications and information exchange between systems—Local and metropolitan area networks—Specific requirements Part 11: Wireless LAN Medium Access Control (MAC) and Physical Layer (PHY) Specifications, IEEE Computer Society, IEEE Std 802.11™—2007, Jun. 12, 2007.*

Zhejiang University Master Thesis. Research of Wireless Sensor Network Construction Based on IEEE802.15.4. Ouyang, Feng. Feb. 2006. Abstract provided by Unitalen Attorneys at Law.

LAN. Interface. Feb. 2007. Partial translation provided by Unitalen Attorneys at Law.

IEEE P802.11 Wireless LANs. Efficient Mesh Security and Link Establishment. Nov. 2006.

Extended European Search Report regarding Application No. 09704782.3-2413/2234438, dated Nov. 20, 2012.

Korean Notice of Allowance regarding Application No. 10-2010-7018127, dated Sep. 22, 2011. Translation provided by Unitalen Attorneys at Law.

* cited by examiner

WIRELESS PERSONAL AREA NETWORK ACCESS METHOD BASED ON PRIMITIVE

This application claims the benefit of Chinese patent application No. 200810017344.8 filed with the Chinese Patent Office on Jan. 18, 2008 and titled "Primitive-based Wireless Personal Area Network Access Method", which is incorporated herein by reference in its entirety.

FIELD OF THE INVENTION

The present invention relates to a Wireless Personal Area Network access method and in particular to a primitive-based Wireless Personal Area Network access method.

BACKGROUND OF THE INVENTION

In recent years, wireless communications advance rapidly, and all sorts of new technologies have been developed, from 3G in cellular communications, to Local Multipoint Distribution Services (LMDS) and Multichannel Microwave Distribution System (MMDS) in Broadband Wireless Access, further to WLAN Authentication and Privacy Infrastructure (WAPI), IEEE 802.11b, 802.11a and 802.11g in Wireless LAN. With wireless communication technologies, the world has become smaller than ever before. New concepts and new products, including ubiquitous network terminals, people-oriented customized and smart mobile computing, and convenient and rapid wireless access and wireless interconnection, are fitting into people's work and life. Various consumer electronics, such as mobile phones, Personal Digital Assistants (PDAs), laptops and digital cameras, have become a part of people's life. As the peripheral devices increase, it turns into an annoying problem to realize information sharing between these devices in a limited and changeful office or home environment with low cost and simple measures. Wireless Personal Area Network (WPAN) is a new wireless communication technology to solve this problem that requires limited operation area, supports a variety of service types and serves a particular group, and to realize seamless wireless connections.

As a wireless network with a smaller coverage than Wide Area Network and Local Area Network, WPAN has become an important component in communication networks. WPAN is also a prominent technology in 4G wireless communications and control, and supports seamless connections with various air interfaces in 2G and 3G mobile communications. If we say that the access network is the "last kilometer" to digitalization, then WPAN must be the "last 50 meters". WPAN provides in the Personal Operating Space (POS) seamless wireless connections with a variety of service types and serving a particular group. The POS is a small region in proximity to an individual, typically having a radius of 10 meters, where communication is accomplished based on Ad hoc. The POS is tied to a person, particularly to a handheld operated by the person, and moves along with the person. WPAN provides for devices in the POS the ability to communicate, and allows them to communicate with other devices entering the POS. WPAN can form naturally when needed, without user intervention, and provides interoperability with established networks or independent networks. WPAN also supports authentication and secure operation modes, permitting rapid connections with authorized personal devices and preventing connections to other unauthorized devices. WPAN is intended for the personal use market, realizing convenient and rapid data transmission among consumer electronics, and thus having the advantages such as cheap, small in size, easy to use, and energy-efficient.

To access a WPAN, a device has to connect with a coordinator in the WPAN. The coordinator provides for the device access to the WPAN and routing functions. Normally, the coordinator itself may also function as a terminal. There are three access methods for WPAN:

Access method 1: the device accesses the WPAN in a non-secure mode and obtains a network address, then communicates with other devices in the WPAN; or, the device obtains a secure service key from the WPAN then performs secure communication with other devices in the WPAN.

Access method 2: the device performs a security operation on the association process using a pre-shared key, and if the coordinator can desecure the security operation, the coordinator allows the device to access the WPAN, and the device accesses the WPAN in a secure mode and obtains a network address.

Access method 3: the device accesses the WPAN in a non-secure mode and obtains a network address, then performs authentication with a WPAN administrator, and if the authentication succeeds, the device is allowed to access the WPAN; otherwise, the device is removed from the WPAN.

The access method 1, which is enough for WPANs requiring no security or WPANs where only secure communication is needed, is an optional access form in establishing a WPAN. The access method 2 requires pre-sharing of a session key, and due to its lack of randomness, the pre-shared session key is easy to be cracked, therefore the access method 2 is of poor safety. The access method 3 requires authentication between each device to access the WPAN and the WPAN administrator, resulting in high communication traffic and low efficiency; in addition, any device may launch a DoS attack, that is, to access the WPAN in a non-secure mode and obtain a network address then performs authentication with the WPAN administrator, which is ended with authentication failure.

In the layered model of network, the layers follow a strict one-way dependency, and division and cooperation of the layers reflect on the interfaces between neighboring layers.

"Service" is an abstract concept describing the relationship between neighboring layers, that is, a group of operations provided by a layer to the layer above it. The layer below is the service provider, and the layer above is the user requesting services. A representation of service is primitive, such as a system call or a library function. A system call is a service primitive provided by a system core to a network application or a high-layer protocol. An (N)-layer always provides to an (N+1) layer a service more complete than an (N−1) layer; otherwise the (N)-layer is needless.

SUMMARY OF THE INVENTION

An object of the present invention is to provide a primitive-based Wireless Personal Area Network access method, solving the technical problem that the existing Wireless Personal Area Network access method is of poor safety and low efficiency.

The technical solution provided by the invention includes:

A primitive-based Wireless Personal Area Network (WPAN) access method, includes:

step 11: broadcasting, by a coordinator, a beacon frame to a device requesting to access a WPAN, the beacon frame including authentication requirement information for the device and suites of authentication and key management supported by the coordinator;

step 12: verifying, by the device, the authentication requirement information, and if the coordinator requires authentication of the device, the coordinator performs primitive-based authentication with the device, obtains a session key and performs association according to the session key; if the coordinator does not require authentication of the device, the coordinator performs association with the device.

Preferably, the coordinator performing primitive-based authentication with the device includes:

step 21: obtaining, by the device, the suites of authentication and key management supported by the coordinator from the beacon frame sent by the coordinator;

step 22: sending, by the device, an access request to the coordinator, after selecting one of the suites of authentication and key management;

step 23: performing, by the coordinator, authentication process with the device based on an authentication primitive under the suite of authentication and key management selected by the device, on reception of the access request from the device, wherein authentication protocol data is encapsulated and transmitted in an authentication command frame of the MAC layer.

Preferably, the obtaining a session key includes: generating, in the authentication process, the session key between the coordinator and the device.

Preferably, the obtaining a session key includes: generating, in the authentication process, a master key between the coordinator and the device; and performing, by the coordinator and the device, a session key negotiation process by using the master key based on a session key negotiation primitive, wherein session key negotiation protocol data is encapsulated and transmitted in a session key negotiation command frame of the MAC layer.

Preferably, the performing association according to the session key includes:

step 51: sending, by the device, an association request to the coordinator; and performing, by the device, a security operation on the association request by using the session key;

step 52: performing, by the coordinator, desecuring on the association request, on reception of the association request sent by the device; and generating an association response after verifying association request information;

step 53: sending, by the coordinator, the association response to the device;

step 54: accessing, by the device, the WPAN via the coordinator.

Preferably, the coordinator performing association with the device if the coordinator does not require authentication of the device includes:

step 61: sending, by the device, an association request to the coordinator;

step 62: generating, by the coordinator, an association response after verifying association request information, on reception of the association request sent by the device;

step 63: sending, by the coordinator, the association response to the device;

step 64: accessing, by the device, the WPAN via the coordinator.

Preferably, the association response includes: a network address assigned by the coordinator to the device, or a reason for an association failure.

The invention has the following advantages:

1. The device may be connected to the WPAN without authentication, or may be connected to the WPAN with authentication. Moreover, the authentication is between the device and the coordinator, thereby avoiding DoS attacks and improving compatibility, security and performance for connecting the device to the WPAN.

2. The device and the coordinator both define an authentication primitive and a session key negotiation primitive in the MAC layer, and authentication protocol data and session key negotiation protocol data are encapsulated and transmitted in an authentication command frame and a session key negotiation command frame of the MAC layer, thereby improving integrability for connecting the device to the WPAN, so that the authentication and session key negotiation process can be integrated in hardware.

3. Compared with the existing WPAN access methods, the association process is not changed at all. Only access requesting, and authentication and session key negotiation processes are added before the association process, with their particular components replaceable; if the coordinator does not require authentication of the device, the whole access process is the same as the existing WPAN access methods, thereby achieving good compatibility and improving extensibility for connecting the device to the WPAN.

4. Under the scenario with authentication, the session key used by the device and the coordinator during the association process is generated by the device and the coordinator in the authentication process or negotiated by using the master key generated in the authentication process, thereby providing good relevance between the authentication process and the association process between the device and the coordinator, and providing randomness of the session key, which further increases the safety for connecting the device to the WPAN.

DETAILED DESCRIPTION OF THE INVENTION

Figure 1:
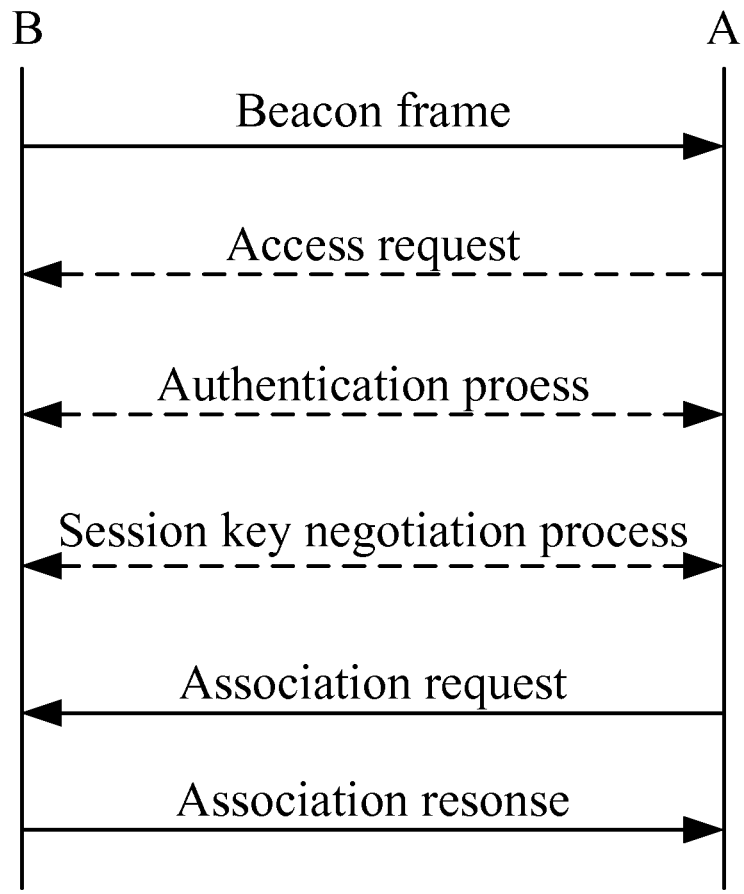
FIG. 1 illustrates an access method for a primitive-based WPAN access system, where A is a device requesting to access a WPAN, B is a coordinator that A associates with in the WPAN, the solid lines represent mandatory processes, and dashed lines represent optional processes.

As shown in FIG. 1, in a primitive-based WPAN access system, a device accesses a WPAN via a coordinator in the WPAN, and the coordinator that the device associates with determines in an access process whether to allow the device to access the WPAN. Both the device and the coordinator define an authentication primitive and a session key negotiation primitive in the MAC layer, and authentication protocol data and session key negotiation protocol data are encapsulated and transmitted in an authentication command frame and a session key negotiation command frame of the MAC layer. The coordinator broadcasts a beacon frame, the device identifies an authentication requirement for the device by the coordinator according to the beacon frame broadcasted by the coordinator, and if the coordinator does not require authentication of the device, then the device performs an association process with the coordinator; if the coordinator requires authentication of the device, then the device selects an authentication and key management suite and sends an access request to the coordinator, the coordinator initiates an authentication and session key negotiation process between the coordinator and the device on reception of the access request, and only when the coordinator and the device succeed in authenticating each other and obtain a corresponding session key, the device and the coordinator perform an association process. When succeeding in association, the device accesses the WPAN via the coordinator, thereby normal communication is achieved.

Figure 2:
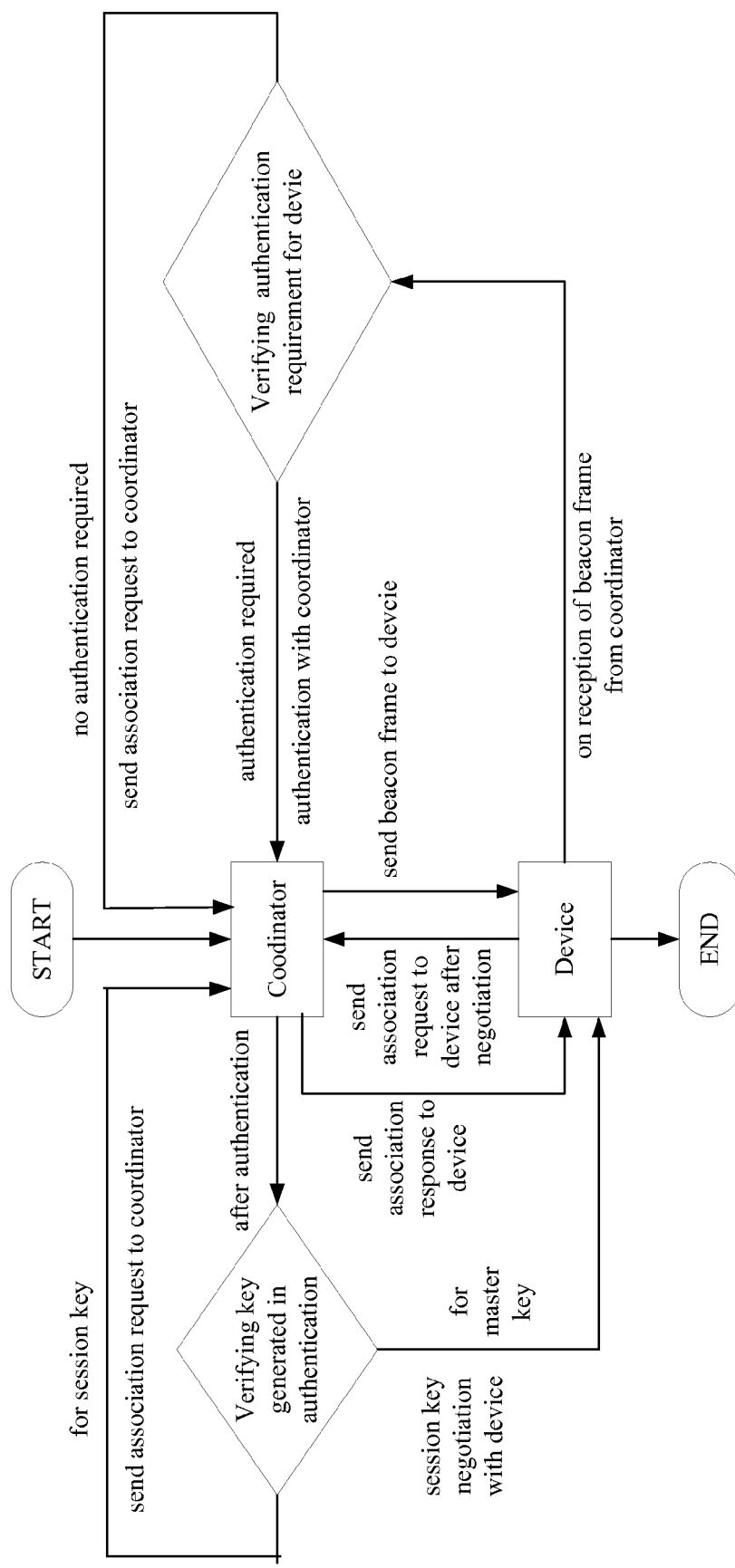
FIG. 2 illustrates a flow chart for a primitive-based WPAN access system.

An access method for a primitive-based WPAN access system may be implemented as below, with reference to FIG. 1. And FIG. 2 shows a flow chart for the primitive-based WPAN access system.

Step 1) The coordinator broadcasts a beacon frame. If the coordinator does not require authentication of the device, the coordinator indicates in the beacon frame that authentication of the device is not required; otherwise, the coordinator indicates in the beacon frame that authentication of the device is required, and indicates in the beacon frame that the suites of authentication and key management are supported by the coordinator.

Step 2) On reception of the beacon frame sent by the coordinator in step 1), the device first verifies the authentication requirement for the device, and if the coordinator does not require authentication of the device, then go to step 5); if the coordinator requires authentication of the device and the device supports authentication, then the device selects an authentication and key management suite that is supported by the coordinator, and sends an access request to the coordinator. The access request includes the authentication and key management suite selected by the device.

Step 3) On reception of the access request sent by the device in step 2), the coordinator first identifies the authentication and key management suite selected by the device, and initiates an authentication process with the device. If the authentication fails, the access process is terminated; otherwise, if the coordinator and the device generate a session key between the coordinator and the device during the authentication process, then go to step 5); if the coordinator and the device generate a master key between the coordinator and the device during the authentication process, then go to step 4). Both the device and the coordinator define an authentication primitive in the MAC layer, the authentication between the device and the coordinator is performed based on the authentication primitive, and authentication protocol data is encapsulated and transmitted in an authentication command frame and a session key negotiation command frame of the MAC layer.

Step 4) If the coordinator and the device generate a master key between the coordinator and the device in step 3), the coordinator and the device perform a session key negotiation process using the master key between the coordinator and the device. If the session key negotiation fails, the access process is terminated; otherwise, go to step 5). Similarly to step 3), both the device and the coordinator define a session key negotiation primitive in the MAC layer, the session key negotiation between the device and the coordinator is performed based on the session key negotiation primitive, and session key negotiation protocol data is encapsulated and transmitted in a session key negotiation command frame of the MAC layer.

Step 5) If the device learns in step 2) that the coordinator does not require authentication of the device, or, if the device and the coordinator obtains a session key between the device and the coordinator through the authentication and session key negotiation process, the device sends an association request to the coordinator. If the device and the coordinator have a session key, the device performs a security operation on the association request using the session key.

Step 6): On reception of the association request sent by the device in step 5), the coordinator verifies whether the association request is with the security operation. If the association request sent by the device in step 5) is with the security operation, then the coordinator performs desecuring on the association request, and sends an association response to the device after verifying the association request information, the association response being an association response with a security operation performed using the session key between the device and the coordinator. Otherwise, the coordinator generates an association response and sends it to the device after verifying the association request information, the association response being an association response without a security operation. If the coordinator allows the device to access the WPAN, then the association response includes a network address assigned by the coordinator to the device, the device accesses the WPAN via the coordinator, and thereby achieving normal communication between the device and the coordinator; otherwise, the association response includes a reason for the failure of the association between the device and the coordinator.

The invention claimed is:

1. A primitive-based Wireless Personal Area Network (WPAN) access method, comprising:
(step 11): broadcasting, by a coordinator, a beacon frame to a device requesting to access a WPAN, the beacon frame comprising authentication requirement information for the device and suites of authentication and key management supported by the coordinator; and
(step 12): verifying, by the device, the authentication requirement information, and if the coordinator requires authentication of the device, performing primitive-based authentication and a session key negotiation process by the coordinator and the device, and when the coordinator and the device obtain a session key, performing a security operation on an association process by using the session key; if the coordinator does not require authentication of the device, performing association by the coordinator and the device;
wherein when the coordinator allows the device to access the WPAN during the association, the coordinator assigns a network address to the device during the association.

2. The method according to claim 1, wherein the coordinator performing primitive-based authentication with the device comprises:
(step 21): obtaining, by the device, the suites of authentication and key management supported by the coordinator from the beacon frame sent by the coordinator;
(step 22): sending, by the device, an access request to the coordinator, after selecting one of the suites of authentication and key management; and
(step 23): performing, by the coordinator, an authentication process with the device based on an authentication primitive under the authentication and key management suite selected by the device, on reception of the access request from the device, wherein authentication protocol data is encapsulated and transmitted in an authentication command frame of a MAC layer.

3. The method according to claim 1, wherein the obtaining the session key comprises:
generating, in an authentication process, the session key between the coordinator and the device.

4. The method according to claim 1, wherein the obtaining the session key comprises:
generating, in an authentication process, a master key between the coordinator and the device; and
performing, by the coordinator, the session key negotiation process with the device by using the master key based on a session key negotiation primitive, wherein session key negotiation protocol data is encapsulated and transmitted in a session key negotiation command frame of a MAC layer.

5. The method according to claim 1, wherein performing the security operation comprises:
   (step 51): sending, by the device, an association request to the coordinator; and performing, by the device, the security operation on the association request by using the session key;
   (step 52): performing, by the coordinator, desecuring on the association request, on reception of the association request sent by the device; and generating an association response after verifying association request information;
   (step 53): sending, by the coordinator, the association response to the device; and
   (step 54): accessing, by the device, the WPAN via the coordinator.

6. The method according to claim 1, wherein the coordinator performing association with the device if the coordinator does not require authentication of the device comprises:
   (step 61): sending, by the device, an association request to the coordinator;
   (step 62): generating, by the coordinator, an association response after verifying association request information, on reception of the association request sent by the device;
   (step 63): sending, by the coordinator, the association response to the device; and
   (step 64): accessing, by the device, the WPAN via the coordinator.

7. The method according to claim 5, wherein the association response comprises: the network address assigned by the coordinator to the device, or a reason for an association failure.

8. The method according to claim 6, wherein the association response comprises: the network address assigned by the coordinator to the device, or a reason for an association failure.

* * * * *